No. 648,361. Patented Apr. 24, 1900.
J. F. SHEAHAN.
CULTIVATOR.
(Application filed Dec. 26, 1899.)
(No Model.)

WITNESSES
J. J. Richardson
N. E. Carr.

John F. Sheahan, INVENTOR,
By Robert S. Carr, Atty.

THE NORRIS PETERS CO., PHOTO-LITHO., WASHINGTON, D. C.

UNITED STATES PATENT OFFICE.

JOHN F. SHEAHAN, OF HAMILTON, OHIO, ASSIGNOR TO THE H. P. DEUSCHER COMPANY, OF SAME PLACE.

CULTIVATOR.

SPECIFICATION forming part of Letters Patent No. 648,361, dated April 24, 1900.

Application filed December 26, 1899. Serial No. 741,556. (No model.)

*To all whom it may concern:*

Be it known that I, JOHN F. SHEAHAN, a citizen of the United States, and a resident of Hamilton, Ohio, have invented certain new and useful Improvements in Cultivators, of which the following is a specification.

My invention relates to cultivators of the class known as "disk" cultivators; and the objects of my improvement are to provide means to simultaneously adjust the disk gangs laterally on the frame and in different vertical angles and to provide the clamping-nuts with cam-wrenches. These objects are attained in the following-described manner, as illustrated in the accompanying drawings, in which—

Figure 1:
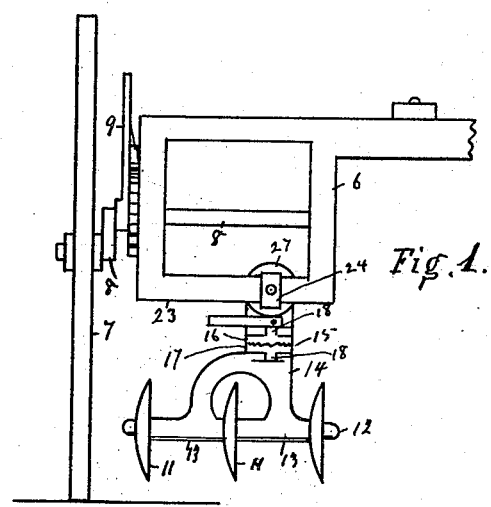
Figure 2:
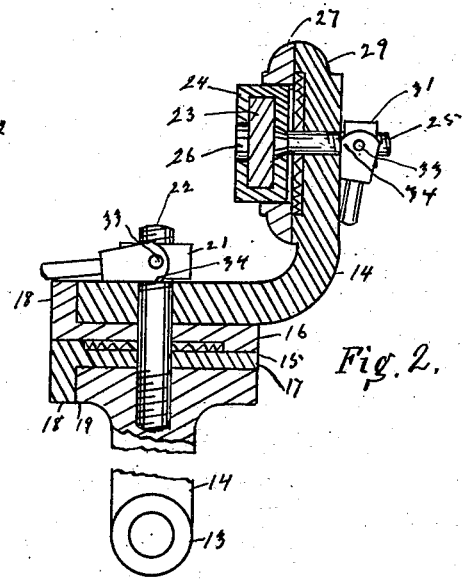
Figures 4, 5:
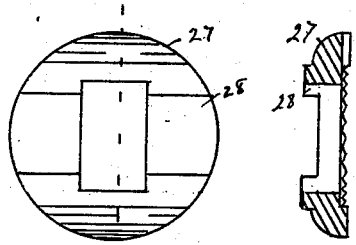
Figure 3:
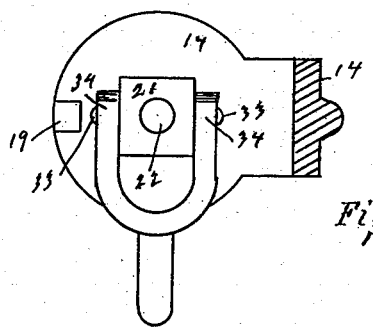

Figure 1 is a rear elevation of one side of a cultivator embodying my improvement; Fig. 2, a side elevation of the shank, with parts in section; Fig. 3, the plan of a cam-wrench in clamped position on the contiguous parts, and Figs. 4 and 5 details of construction.

In the drawings, 6 represents one side of a cultivator frame or arch mounted on ground-wheels 7 by means of crank-axles 8 and vertically adjustable by means of hand-lever 9. Disks 11 are mounted on shaft 12, that is journaled in bearings 13, formed on shank 14. Said shank is laterally adjustable on the frame and also in different vertical angles. Joint 15 in the shank provides for the adjustment of shaft 12 in different horizontal angles.

For the purpose of facilitating the casting of the members of the shank the serrations are omitted from the contiguous surfaces that form joint 15, and similar disk plates 16 and 17, each formed with radial teeth or serrations on one side to register with the other, are interposed between them. Lugs 18, formed on the edge of each of said disk plates, engage with corresponding notches 19, formed in the contiguous portions of the shank. Stud-bolt 22, provided with nut 21, is secured in one member of the shank and is arranged to securely fasten the other member and the disk plates thereto and together to maintain shaft 12 in adjusted position to different horizontal angles.

Cross-bar 23 of the frame is preferably rectangular in cross-section, and the opening in rectangular collar 24 corresponds in form to permit it to slide and to prevent it from turning thereon. The head of clamping-bolt 25 is seated in a countersunk hole formed in one side of the collar after being passed through larger hole 26, formed in the opposite side thereof. Circular plate 27 contains a rectangular opening for the insertion therein of collar 24, and transverse seat 28, formed on one side of said plate, maintains it in proper sliding position on the cross-bar. The other side of the plate is formed with radial notches or serrations to register with and engage similar serrations formed on the side of circular head 29 of the shank. Nut 31 and the cam-wrench thereon serve to simultaneously secure the shank as adjusted in different positions on the frame and in adjustment to different vertical angles.

The nuts on the clamping-bolts are formed with trunnions 33, whereon cam-wrenches are swiveled. The jaws of the wrenches are wider than the length of the nuts to form cams 34 to clamp the parts securely together. By turning the nuts with the wrenches the pressure of the cams may be regulated and any wear taken up.

Having fully described my improvement, what I claim as my invention, and desire to secure by Letters Patent of the United States, is—

1. In a cultivator, the combination with the frame and the shank, of a plate interposed between them and formed with a rectangular opening, a collar movable laterally in the opening and arranged to slide on a cross-bar of the frame, and a clamping-bolt secured to the collar and arranged to clamp the parts together and to the frame.

2. In a cultivator, the combination with the cross-bar of the frame and a shank adjustable thereon and in different vertical angles and formed with serrations on one side of its head, of a plate interposed between the shank and bar and formed with a rectangular opening and with serrations on one side to engage with the serrations on the shank and with a seat on the other side to slidingly engage with the bar, a collar arranged to slide on the bar and movable laterally within the opening in the plate and a clamping-bolt arranged to clamp the parts immovably together.

3. In a cultivator, the combination with a clamping-bolt and a nut threaded thereon, of a wrench swiveled on the nut and formed with cam-shaped jaws that project laterally beyond the end of the nut.

4. In a cultivator, the combination of a clamping-bolt, a threaded nut thereon, trunnions formed on the nut, and a wrench swiveled on the trunnions and formed with cam-shaped jaws that extend laterally beyond the lower end of the nut.

JOHN F. SHEAHAN.

Witnesses:
R. S. CARR,
C. H. SCHELL.